US008485768B2

(12) United States Patent
Holste

(10) Patent No.: US 8,485,768 B2
(45) Date of Patent: Jul. 16, 2013

(54) CONNECTING FLANGE, PARTICULARLY FOR AN ELECTRIC TERMINAL

(75) Inventor: Dieter Holste, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 524 days.

(21) Appl. No.: 12/741,731

(22) PCT Filed: Nov. 27, 2008

(86) PCT No.: PCT/EP2008/010082
§ 371 (c)(1), (2), (4) Date: Jun. 21, 2010

(87) PCT Pub. No.: WO2009/068286
PCT Pub. Date: Jun. 4, 2009

(65) Prior Publication Data

US 2010/0266362 A1 Oct. 21, 2010

(30) Foreign Application Priority Data

Nov. 30, 2007 (DE) ........................ 10 2007 058 041

(51) Int. Cl.
*F16B 23/00* (2006.01)

(52) U.S. Cl.
USPC .......................................... 411/396; 411/383

(58) Field of Classification Search
USPC ................ 411/360, 383, 396, 397, 80.6, 338, 411/367, 372.6, 377, 549
See application file for complete search history.

(56) References Cited

U.S. PATENT DOCUMENTS

| | | | | |
|---|---|---|---|---|
| 2,486,769 A * | 11/1949 | Watson, Jr. | 411/180 |
| 2,976,345 A * | 3/1961 | Whitted | 174/153 R |
| 3,785,670 A * | 1/1974 | Smith | 280/79.11 |
| 4,478,478 A * | 10/1984 | Durand et al. | 439/723 |
| 4,619,122 A * | 10/1986 | Simpson | 70/34 |
| 4,640,524 A * | 2/1987 | Sedlmair | 280/611 |
| 4,827,725 A | 5/1989 | Morse | |
| 4,944,644 A * | 7/1990 | Bell | 411/375 |
| 5,518,351 A * | 5/1996 | Peil | 411/383 |
| 5,536,124 A * | 7/1996 | Silva | 411/85 |
| 5,584,629 A * | 12/1996 | Bailey et al. | 411/178 |
| 6,004,167 A | 12/1999 | Hirakawa | |

FOREIGN PATENT DOCUMENTS

| | | |
|---|---|---|
| CH | 511522 A | 8/1971 |
| EP | 1811613 A1 | 7/2007 |
| FR | 1173759 A | 3/1959 |
| JP | S59-34112 | 2/1984 |
| JP | S60-196019 | 10/1985 |
| JP | H02-037263 | 2/1990 |

OTHER PUBLICATIONS

Abstract of EP1811613; Jul. 25, 2007.

(Continued)

*Primary Examiner* — Roberta Delisle
(74) *Attorney, Agent, or Firm* — Senniger Powers LLP

(57) ABSTRACT

The invention relates to a connecting flange for an electric terminal, comprising a housing and a duct provided thereon for receiving a screw, wherein the duct has a duct wall made of an elastic material, on which a safety device is configured such that the screw can be captively received by the duct when not screwed in. A free cross-section of the safety device and the largest cross-section of the screw have different shapes, wherein the length of an interior circumference of the safety device is adapted to the length of the exterior circumference of the screw.

17 Claims, 2 Drawing Sheets

OTHER PUBLICATIONS

International Search Report, PCT/EP2008/010082, dated Mar. 27, 2009, 3 pages.

Abstract of JPS59-34112; Feb. 24, 1984.

Abstract of JPS60-196019; Oct. 4, 1985.

Abstract of JPH02-037263; Feb. 7, 1990.

* cited by examiner

CONNECTING FLANGE, PARTICULARLY FOR AN ELECTRIC TERMINAL

REFERENCE TO RELATED APPLICATION

This application claims priority to German application 10 2007 058 041.1 filed Nov. 30, 2007.

FIELD OF INVENTION

The present invention relates to a connecting flange, especially for an electrical connecting terminal or another electrical component that comprises a housing and a shaft provided on it for receiving a screw, which shaft has a shaft wall, especially of an elastic material, and in which a safety device is provided for receiving the screw in the shaft in such a manner that it can not be lost. Although the invention is described in the following with reference to being used as connecting flange, the invention can also be used in general to secure screws in the shafts of electrical components.

BACKGROUND

Safety arrangements for screws are known in the state of the art. For example, DE 296 21 267 U1 teaches a screw terminal in which the screw head is covered by a cover housing except for a screwdriver opening. Ribs are provided that are formed in axial direction in the cover housing and distributed over the circumference which ribs have an extremely small distance relative to each other that is smaller than the diameter of the screw head. In this state of the art, when the terminal screw is screwed in the ribs are deformed and abraded. The screw is securely received in the cover housing conditioned by the elasticity of the ribs.

This known solution has the disadvantage, however, that the ribs extending in the longitudinal direction of the screw on the cover housing must be manufactured in precise coordination with the screw to be used in order to ensure a reliable functioning.

The tolerances to be observed are dimensioned very closely since the ribs must on the one hand make it possible to screw the screw in without destroying the cover housing by overexpansion, whereas on the other hand the screw must be securely held after being introduced. This results in the need to exactly observe the measurements and brings about a high manufacturing cost and therefore greater expenses during the production.

DE 30 28 958 C2 teaches a serial terminal in which the terminal screw is arranged in a shaft of a body in such a manner that it can be lowered. A profiling is provided in the shaft that is elastically deformed when the screw is screwed in and when the head is passed over. After the profiling is passed over the profiling deforms back only partially in an elastic manner so that the profiling designed as a bead functions as a safety.

Even in the case of this arrangement known from the state of the art a very close coordination of the constructional measurements and the observance of very close manufacturing tolerances are required in order to reliably hinder a destruction of the component during screwing in and the loss of the inserted screw.

Furthermore, apparatuses are known from the state of the art in which a circumferential rib is provided in the shaft receiving the screw which rib has a smaller free inside diameter than the greatest outside diameter of the screw head. If a screw is introduced into such a shaft and moved past the annular rib, it is reliably received in the shaft. However, even this functioning solution requires a precise coordination of the manufacturing tolerances since the screw flange can otherwise be torn off during an automatic mounting of the screw if the expansion forces exceed the stability of the component when the screw head passes through.

Such a system functions during a slow assembly by hand or also by exactly observing the tolerances, which, however, again brings about a significant technical manufacturing cost and therefore higher expenses.

Given the cited state of the art, the present invention therefore has the problem of making available a device for reliably receiving a screw on an electrical component and in particular on a connecting terminal with greater manufacturing tolerances being admissible and a high reliability of prevention against loss can be achieved.

SUMMARY OF THE INVENTION

This problem is solved by a connecting flange with the features of claim 1. Preferred further developments of the invention are defined in the subclaims. Further advantages and features result from the description of the exemplary embodiment.

A connecting flange in accordance with the invention is provided in particular for an electrical connecting terminal or another electrical component and comprises at least one housing and at least one shaft provided in it for receiving a screw. In the connecting flange in accordance with the invention the shaft has a shaft wall of an elastic material. A safety device is constructed or provided on the shaft wall so that the screw can be reliably received by the shaft at least in the non-screwed-in state. To this end the length of an inside circumference of the safety device is a function of the length of the outside circumference of the screw. Furthermore, a free cross-section of the safety device and the greatest cross-section of the screw have different shapes.

The invention offers many advantages. A significant advantage is the fact that, conditioned by the different cross-sectional shapes, the screw is reliably received in the shaft even in the non-screwed-in state.

Additionally, since the length of the inner circumference of the safety device is a function of the length of the outer circumference of the screw, this means that the screw diameter is greater at at least one position than the corresponding free diameter of the shaft. This results in a natural security against loss of the screw in the shaft.

According to the invention the screw is introduced making use of the elastic properties of the shaft wall. The fact that the length of the outside diameter of the screw and of the inner circumference of the safety device are a function of one another means that during the introduction of the screw a local deformation of the shaft wall must occur in order that the screw can be introduced; however, since the circumferential lengths are related, no expansion of the complete circumference of the shaft wall must take place but rather local bends are sufficient that do not, however, result in their totality to an expansion of the shaft. After the screw or the screw head has been run through, the shaft wall deforms back elastically so that the screw is reliably received.

In particular, the length of the inside circumference of the safety device therefore corresponds approximately to the length of the outside circumference of the screw and the length of the inside circumference of the safety device is in particular somewhat greater than the length of the outside of the screw in order to ensure in this manner that on the whole no expansion of the shaft wall occurs or is necessary over the entire circumference. This means that the inside circumference of the safety device is, for example, 1%, 3% or also about 5% or more longer than the outside circumference of the screw.

In a preferred further development of the invention the cross-sectional shape of the shaft is constructed to be polygonal whereas the screw has a rounded-off cross section.

A polygonal screw that has a number of corners distinctly greater than the number of corners of the shaft is also possible.

As a result of the fact that the circumferential lengths are a function of one another a slight local deformation of the shaft walls is brought about by the introduction of the screw into the polygonal shaft and the shaft wall is locally bent in particular at the shaft corners.

The shaft wall preferably has between four and eight corners on the safety device, which corners can also be constructed to be rounded-off.

In another preferred embodiment the cross-sectional shape of the screw is constructed to be polygonal while the shaft has a rounded-off or round cross-section. In this embodiment a compression and a stretching of the material is brought about locally analogously to the previous embodiment and on the whole a complete stretching of the shaft circumference is reliably avoided, which prevents an overloading of the shaft during the introduction of the screw.

In an especially preferred embodiment the screw has an oval cross section and the shaft has a round or rounded-off cross section or, inversely, the screw has a round cross section and the shaft an oval cross section. As a consequence of the circumferential lengths the smallest diameter of the oval cross section is shorter and the greatest diameter of the oval cross section is longer than the diameter of the round cross section so that during the introduction of the screw local material is elastically displaced, which performs elastically back again at least substantially. As a result thereof, the screw is reliably received into the shaft by the safety device.

In preferred further developments of all the previously described embodiments the shaft wall preferably consists at least partially of an insulating material. The shaft wall is preferably constructed with a thin wall in order to increase the elasticity.

In the case of more massive bodies the shaft wall can be constructed with a thin wall and be surrounded radially on the outside at least in sections by a trough or the like that preferably extends deeper from the surface than the distance of the safety device from the surface. As a result, the elasticity of the shaft is increased since the material of the shaft wall can bend radially outward locally. Furthermore, the bending of the shaft wall radially inward is facilitated since the shaft wall has no contact with the surrounding material of the body there, conditioned by the trough.

In all embodiments the housing consists at least partially of a plastic and especially of a thermoplastic that has elastic properties.

The safety device is preferably arranged at or in the vicinity of the accessible end of the shaft, which limits the needed construction depth.

In preferred embodiments the safety device comprises at least one inwardly projecting holding device or holder. In particular, two approximately oppositely located and inwardly projecting holding ribs are preferably provided on the housing or on the wall of the shaft. A reliable hold is achieved by two oppositely located holding ribs.

In all embodiments the shaft wall preferably has a phase winding on its outer side in the area of the safety device.

The shaft advantageously consists at least partially of an insulating material. As a rule the screw is provided with an enlarged screw head and with a shaft with a threaded section.

Preferably one middle section of the shaft extends behind the safety device in the depth of the shaft in which section the screw or the screw head can be received in its total circumference with play so that the safety device forms an undercut that extends over an angular section or several angular sections or also completely around the circumference of the shaft.

The shaft is preferably constructed to be round in this middle section of the shaft and the inside circumference of the shaft is distinctly larger there than the outside circumference of the screw head or of the screw.

The connecting flange in accordance with the invention permits the reliable receiving of screws with a clearly reduced requirement on the precision of the manufacture so that a more economical manufacture with greater quality at the same time is possible.

BRIEF DESCRIPTION OF THE FIGURES

Further advantages and features of the present invention result from the description of the exemplary embodiment explained in the following with reference made to the following drawings.

DETAILED DESCRIPTION OF PREFERRED EMBODIMENTS

This application claims priority to German application 10 2007 058 041.1 filed Nov. 30, 2007, the entire disclosure of which is incorporated by reference.

An exemplary embodiment of the present invention will now be described with reference made to the attached figures.

Figure 1:
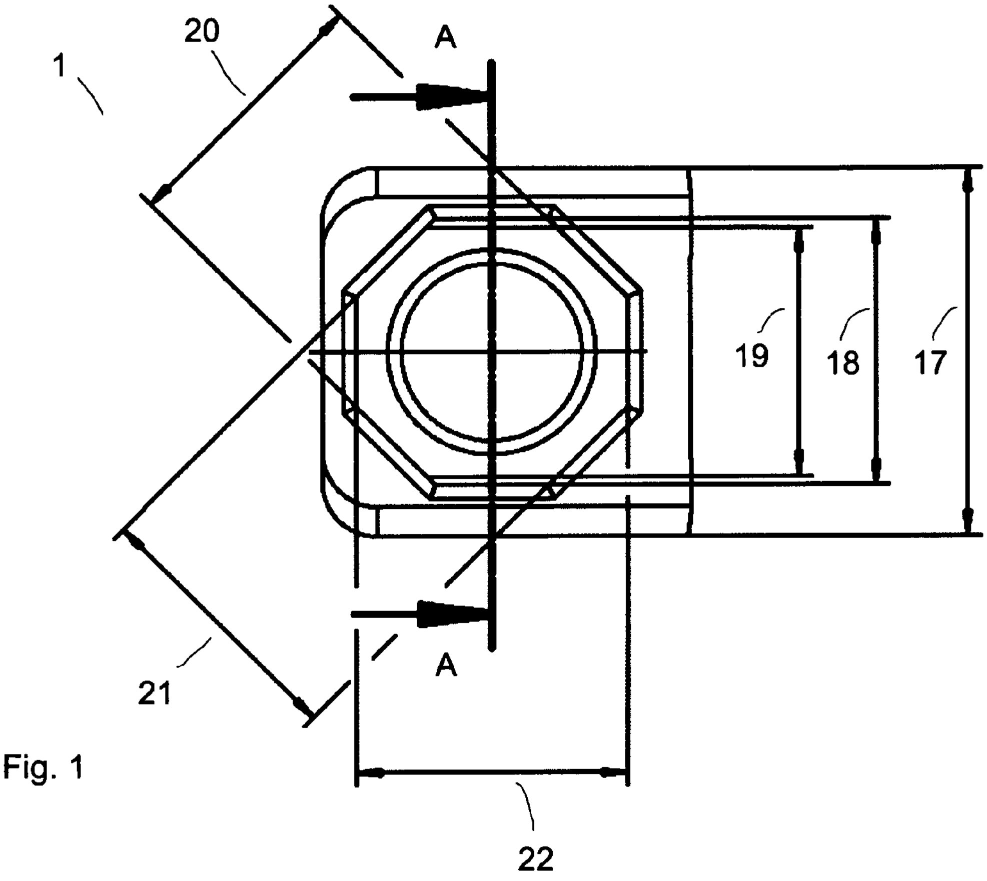
FIG. 1 shows a connecting flange in accordance with the invention in a top view.

FIG. 1 shows a top view of the connecting flange 1 used in particular on electrical connecting terminals. To this end the connecting terminal can serve to receive one or more conductors and be provided, for example, on one or both ends of the housing with a connecting flange in accordance with the invention in order to fasten such a connecting terminal on another component. However, it is also possible to use the invention to secure a conductor on a connecting terminal.

Figure 2:
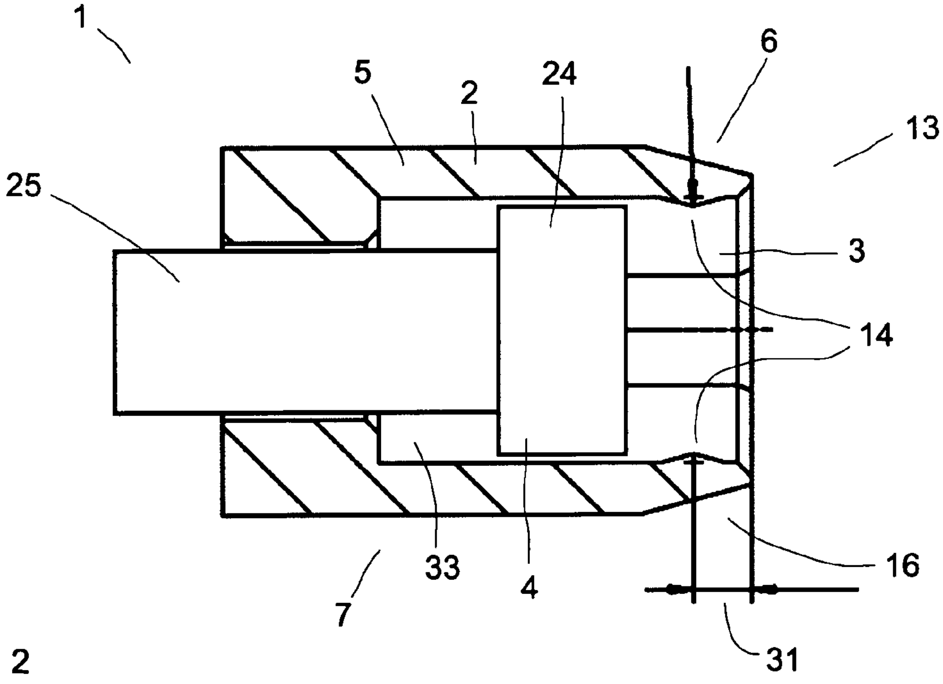
FIG. 2 shows the connecting flange according to FIG. 1 in the cross section A-A with a schematically shown screw.

Connecting flange 1 in accordance with the invention comprises a housing 2 in which a shaft 3 is provided in which the screw 4 is received, as results in particular from the presentation according to FIG. 2. FIG. 2 shows the cross section A-A from FIG. 1.

Housing 2 and in particular the shaft wall 5 of shaft 3 are manufactured here in the exemplary embodiment from an elastic material and consist in particular of a thermoplastic that can be elastically deformed.

FIG. 2 shows only the schematically shown screw 4, that is provided with a screw head 24 and with a screw shaft 25 provided with a threading. Screw 4 is reliably received in shaft 3 of housing 2, so that the state 7 shown in FIG. 2 results, in which the screw is also reliably received and in particular in the non-screwed-in state.

To this end shaft wall 5 comprises a safety device 6 constructed in a manner of an undercut that brings it about that the free diameter of shaft 3 is smaller at at least one position than the corresponding diameter of screw for this position. In general, the greatest diameter of screw 4 has a different cross section than the smallest cross section of shaft 3, whereas the circumferential lengths of the greatest cross section of the screw and the circumferential length of the smallest cross section of the shaft are related at least approximately to each other. This has the consequence that the smallest shaft diameter is greater than the smallest screw diameter, so that screw 4 is reliably received in shaft 3 after the passing over of safety device 6.

Figure 4:
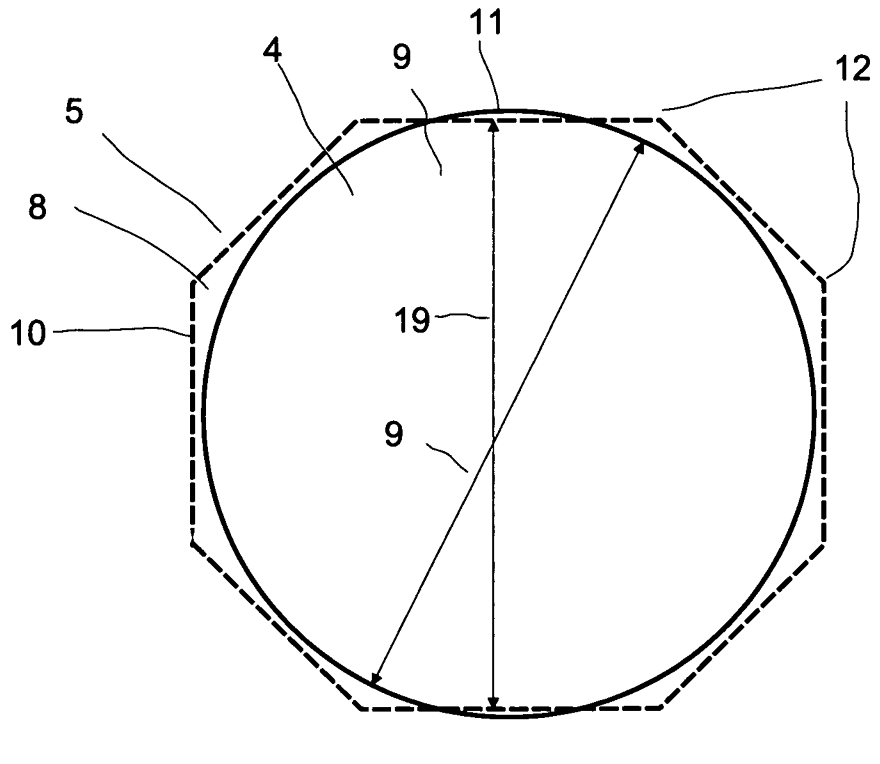
FIG. 4 shows the cross section of the shaft and of the screw head of the connecting flange of FIG. 2.

As can be gathered in particular from the representation according to FIG. 4, in which the greatest cross section of screw 4 and the free cross section 8 of safety device 6 are shown, the greatest diameter 9 of the screw head 4, that is round here, is greater here than the smallest diameter 19 of the free cross section 8 of safety device 6, that is shown in dotted lines and designed in a hexagon here. At the same time, the eight corners 12 of safety device 6 are provided radially outside of the greatest diameter 9 of screw head 24, so that screw head 24 is reliably received in shaft 3 by holding ribs 14 of safety device 6, whereas the circumferential lengths of the safety device and the screw head are a function of each other.

That means here that the length of the inside circumference 10 of safety device 6 is a function of the length of the outside circumference 11 of screw 4 and here of screw head 24. In the exemplary embodiment here the length of the inside circumference of safety device 6 is somewhat greater than the length of outside circumference 11 of screw head 24, in order that an expansion of the entire circumference of safety device 6 is reliably prevented when screw 4 is introduced, because in such instances that can result in damage to the component.

The difference of the circumferential lengths can be a few percent, e.g., 5% or 10% or even 15%. It is important that shaft wall 5 can deform locally during the passing over of screw head 24 so that substantially a bending and no overexpansion of shaft wall 5 takes place during the elastic deformation.

In the exemplary embodiment here the width of connecting flange 1 is approximately 5.4 mm, whereas the free diameters 20, 21 and 22 are the same and are approximately 3.9 ram. The free diameter 19 in the area of safety device 6 is smaller and is 3.65 mm here whereas shaft wall 5 also has a free diameter 18 of 3.9 mm in the area of the accessible end 13. That means that in the area of safety device 6 free diameter 18 is reduced from 3.9 to 3.65 mm, conditioned by holding ribs 14 of safety device 6. Thus, a smooth introduction of the screw into accessible end 13 of shaft 3 is made possible until the screw strikes safety device 6.

Figure 3:
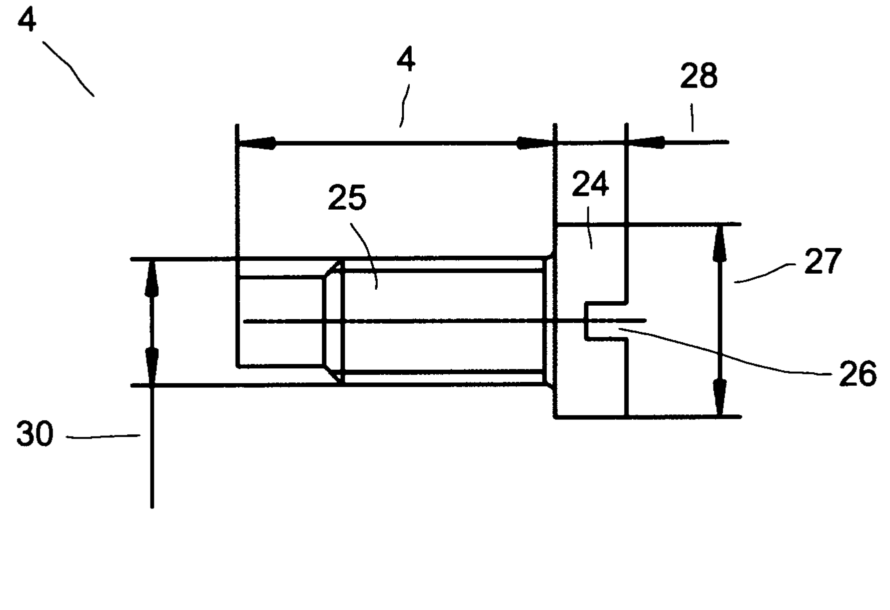
FIG. 3 shows a screw for the connecting flange in accordance with FIG. 1.

FIG. 3 shows screw 4 for connecting flange 1 in more detail. Screw 4 comprising screw head 24 and screw shaft 25 has a circularly designed head in the exemplary embodiment here that has a diameter of 3.8 mm. In order to be able to turn the screw with a tool, screw head 24 is provided with a slot 26. In other embodiments a cross slot or an inner or outer hexagon or the like can also be provided.

Whereas the length of the screw head is approximately 1.4 mm here, screw shaft 25 has a length of 6.2 mm and is provided over the greater part of its length with an outside threading 30 constructed here as an M 2.5 threading. Screw shaft 25 is run through the lower through hole 23 of connecting flange 1.

In other embodiments other dimensions of connecting flange 1 and of shaft 3 as well as of screw 4 are possible. The dimensions can be greater and also smaller.

In order to facilitate the deformation of shaft wall 5 in the area of safety device 6 and to facilitate the production of connecting flange 1 of the invention, a phase winding 16 is provided that increases the elasticity of the shaft wall.

Although the screw head is designed to be round here in the exemplary embodiment and shaft wall 5 has a polygonal cross section, it is also possible to make screw 4 non-circular and shaft 3 round.

In all embodiments the free diameter of shaft 5 is greater overall than the outside diameter of screw 4, at least in the area of the shaft bottom 33, in order to make possible a ready and undisturbed ability of screw 4 to rotate in shaft 3.

List of reference numerals

1 connecting flange
2 housing
3 shaft
4 screw
5 shaft wall
6 safety device
7 non-screwed state
8 free cross section of the safety device
9 greatest cross section of the screw
10 inside circumference
11 outside circumference
12 corner
13 accessible end
14 holding rib
15 outer side
16 phase winding
17 width
18 diameter
19 smallest diameter
21 diameter
22 diameter
23 through hole
24 screw head
25 screw shaft
26 slot
27 head diameter
28 head length
29 shaft length
30 threading diameter
31 distance
32 greatest screw diameter
33 shaft bottom

The invention claimed is:

1. A connecting flange for securing a screw in an electrical connecting terminal, comprising:
- a housing;
- at least one shaft on the housing for receiving the screw, which shaft has a shaft wall of an elastic material on which a safety device is formed, so that the screw can be reliably received by the shaft in a non-screwed-in state,
- wherein a free cross section of the safety device and the greatest cross section of the screw have different shapes,
- a length of an inside circumference of the safety device is adapted to a length of the outside circumference of the screw,
- a free diameter of the shaft is smaller at at least one position than a diameter of the screw due to the safety device, and
- the cross-sectional form of the shaft is constructed to be polygonal whereas the screw has a rounded-off cross section.

2. The connecting flange according to claim 1, in which the shaft wall has between four and eight corners on the safety device.

3. The connecting flange according to claim 1, in which the shaft wall consists at least partially of an insulating material.

4. The connecting flange according to claim 1, in which the shaft wall is constructed to be thin-walled at least in sections.

5. The connecting flange according to claim 1, in which the shaft wall is surrounded radially to the outside at least in sections by a trough.

6. The connecting flange according to claim 1, in which the housing consists at least partially of a plastic.

7. The connecting flange according to claim 1, in which the housing consists at least partially of a thermoplastic.

8. The connecting flange according to claim 1, in which safety device is arranged on the accessible end of the shaft.

9. The connecting flange according to claim 1, in which the safety device comprises at least one inwardly projecting holding rib.

10. The connecting flange according to claim 1, in which the housing comprises two approximately oppositely located and inwardly projecting holding ribs.

11. The connecting flange according to claim 1, in which the safety device comprises an inwardly projecting, circumferential holding rib.

12. The connecting flange according to claim 1, in which the shaft has a phase winding on its outer side in the area of the safety device.

13. The connecting flange of claim 1 wherein the length of an inside circumference of the safety device is adapted to the length of the outside circumference of the screw in that the screw diameter is greater at at least one position than the corresponding free diameter of the shaft.

14. The connecting flange of claim 1 wherein:

the length of an inside circumference of the safety device is a function of the length of the outside circumference of the screw in that the screw diameter is greater at at least one position than the corresponding free diameter of the shaft; and the length of the inside circumference of the safety device is greater than the length of the outside circumference of the screw so that on the whole no expansion of the shaft wall occurs when the screw passes the safety device during insertion into the shaft.

15. The connecting flange of claim 1 further comprising a screw for insertion in the housing, wherein the screw has said shape at its greatest cross section which is different from the shape of the free cross section of the safety device.

16. A connecting flange for securing a screw in an electrical component, comprising:

a housing;

at least one shaft on the housing for receiving the screw, which shaft has a shaft wall of an elastic material on which a safety device is formed, so that the screw can be reliably received by the shaft in a non-screwed-in state, wherein a free cross section of the safety device and the greatest cross section of the screw have different shapes and the screw diameter is greater at at least one position than the corresponding free diameter of the shaft, such that the shaft wall is adapted to undergo local deformation upon introduction of the screw without expansion of the complete circumference of the shaft wall, wherein a length of an inside circumference of the safety device is adapted to a length of the outside circumference of the screw, and wherein a cross-sectional form of the shaft is constructed to be polygonal whereas the screw has a rounded-off cross section.

17. The connecting flange of claim 16 wherein the length of the inside circumference of the safety device is greater than the length of the outside circumference of the screw so that on the whole no expansion of the shaft wall occurs when the screw passes the safety device during insertion into the shaft.

* * * * *